(12) United States Patent
Karaoguz et al.

(10) Patent No.: US 9,298,260 B2
(45) Date of Patent: Mar. 29, 2016

(54) TACTILE COMMUNICATION SYSTEM WITH COMMUNICATIONS BASED ON CAPABILITIES OF A REMOTE SYSTEM

(75) Inventors: Jeyhan Karaoguz, Irvine, CA (US); Robert Rango, Newport Coast, CA (US)

(73) Assignee: BROADCOM CORPORATION, Irvine, CA (US)

( * ) Notice: Subject to any disclaimer, the term of this patent is extended or adjusted under 35 U.S.C. 154(b) by 133 days.

(21) Appl. No.: 13/043,829

(22) Filed: Mar. 9, 2011

(65) Prior Publication Data

US 2011/0221694 A1 Sep. 15, 2011

Related U.S. Application Data

(60) Provisional application No. 61/313,352, filed on Mar. 12, 2010.

(51) Int. Cl.
  *G06F 3/041* (2006.01)
  *G06F 3/01* (2006.01)
  *G06F 3/0488* (2013.01)

(52) U.S. Cl.
  CPC ............. *G06F 3/016* (2013.01); *G06F 3/011* (2013.01); *G06F 3/041* (2013.01); *G06F 3/0416* (2013.01); *G06F 3/0488* (2013.01)

(58) Field of Classification Search
  CPC ............. G06F 3/016; G06F 3/041; B25J 3/00; B25J 3/04; B25J 11/009; B25J 11/008; B25J 13/00; B25J 13/006; B25J 13/081; B25J 13/08; B25J 13/082; B25J 13/084; B25J 13/085; B25J 13/086; B25J 13/088; B25J 13/089

USPC ............. 345/104, 156–184; 178/18.01–20.04
See application file for complete search history.

(56) References Cited

U.S. PATENT DOCUMENTS

| | | | |
|---|---|---|---|
| 2002/0163497 A1* | 11/2002 | Cunningham et al. | 345/156 |
| 2004/0106916 A1* | 6/2004 | Quaid et al. | 606/1 |
| 2005/0219205 A1* | 10/2005 | Bailey et al. | 345/156 |
| 2007/0043725 A1* | 2/2007 | Hotelling et al. | 707/9 |
| 2009/0225046 A1 | 9/2009 | Kim et al. | |
| 2010/0148943 A1* | 6/2010 | Rosenberg et al. | 340/407.1 |
| 2010/0305448 A1* | 12/2010 | Dagonneau et al. | 600/459 |

FOREIGN PATENT DOCUMENTS

| | | |
|---|---|---|
| EP | 1819180 A2 | 11/2006 |
| WO | 0205217 A1 | 1/2002 |
| WO | 2005041009 A2 | 5/2005 |

OTHER PUBLICATIONS

European Patent Office; European Search Report; EP Application No. 11002057.5; Jan. 13, 2015; 4 pgs.
European Patent Office; Replacement European Search Report; EP Application No. 11002057.5; Mar. 9, 2015; 3 pgs.

* cited by examiner

*Primary Examiner* — Temesgh Ghebretinsae
*Assistant Examiner* — Lisa Landis
(74) *Attorney, Agent, or Firm* — Garlick & Markison; Randy Lacasse

(57) ABSTRACT

A system and method for communicating tactile information, substantially as shown in and/or described in connection with at least one of the figures, as set forth more completely in the claims.

17 Claims, 3 Drawing Sheets

TACTILE COMMUNICATION SYSTEM WITH COMMUNICATIONS BASED ON CAPABILITIES OF A REMOTE SYSTEM

CROSS-REFERENCE TO RELATED APPLICATIONS/INCORPORATION BY REFERENCE

This patent application is related to and claims priority from provisional patent application Ser. No. 61/313,352 filed Mar. 12, 2010, and titled "TACTILE COMMUNICATION SYSTEM," the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Present systems are generally designed for the communication of audio and/or video information. Such systems are generally incapable of adequately communicating tactile information. Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for communicating tactile information. These and other advantages, aspects and novel features of the present invention, as well as details of illustrative aspects thereof, will be more fully understood from the following description and drawings.

DETAILED DESCRIPTION OF VARIOUS ASPECTS OF THE INVENTION

Figure 1:
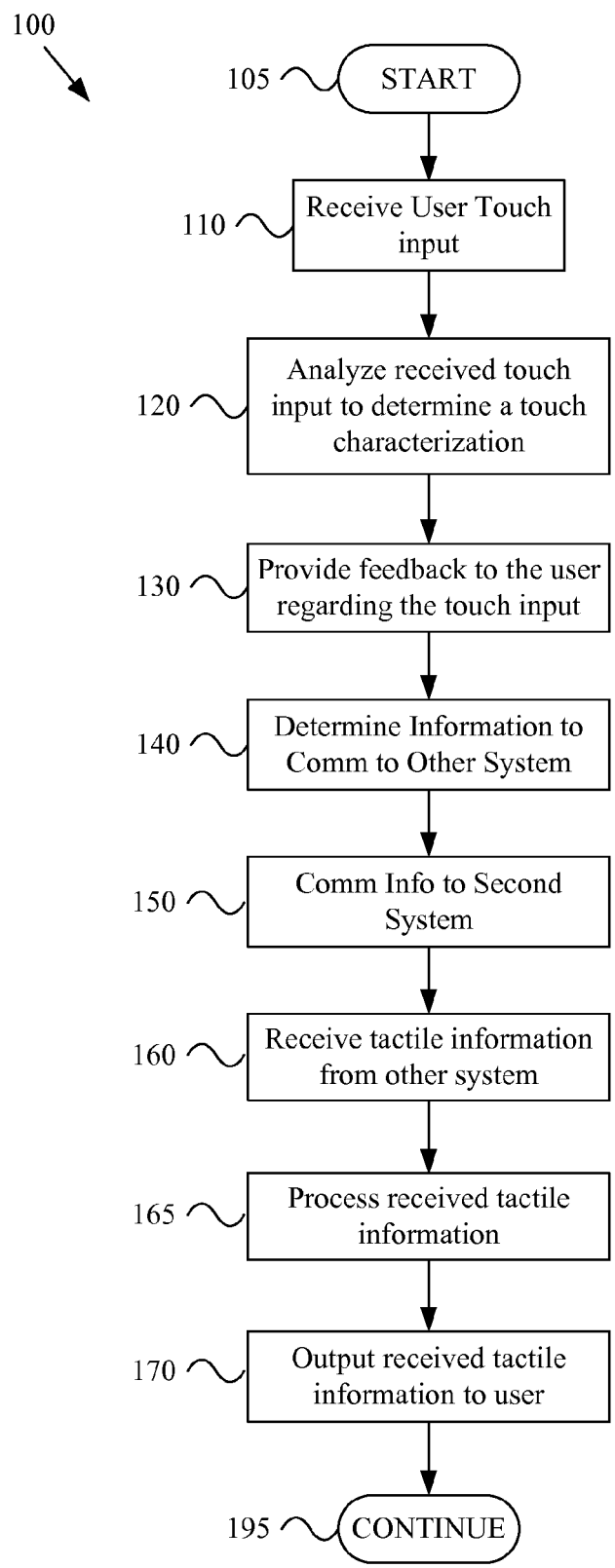
FIG. 1 shows a non-limiting exemplary flow diagram of a method for communicating tactile information, in accordance with various aspects of the present invention.

The following discussion will refer to various communication modules, components or circuits. Such modules, components or circuits may generally comprise hardware and/or a combination of hardware and software (e.g., including firmware). Such modules may also, for example, comprise a computer readable medium (e.g., a non-transitory medium) comprising instructions (e.g., software instructions) that, when executed by a processor, cause the processor to perform various functional aspects of the present invention. Accordingly, the scope of various aspects of the present invention should not be limited by characteristics of particular hardware and/or software implementations of a module, component or circuit unless explicitly claimed as such. For example and without limitation, various aspects of the present invention may be implemented by one or more processors (e.g., a microprocessor, digital signal processor, baseband processor, microcontroller, etc.) executing software instructions (e.g., stored in volatile and/or non-volatile memory). Also for example, various aspects of the present invention may be implemented by an application-specific integrated circuit ("ASIC") and/or other hardware components.

Additionally, the following discussion will refer to various system modules (e.g., computing system and/or device modules). It should be noted that the following discussion of such various modules is segmented into such modules for the sake of illustrative clarity. However, in actual implementation, the boundaries between various modules may be blurred. For example, any or all of the functional modules discussed herein may share various hardware and/or software components. For example, any or all of the functional modules discussed herein may be implemented wholly or in-part by a shared processor executing software instructions. Additionally, various software sub-modules that may be executed by one or more processors may be shared between various software modules. Accordingly, the scope of various aspects of the present invention should not be limited by arbitrary boundaries between various hardware and/or software components, unless explicitly claimed.

The following discussion may also refer to communication networks and various aspects thereof. For the following discussion, a communication network is generally the communication infrastructure through which a communication device (e.g., a computer system with communication capability, a personal computer with communication capability, a laptop computer with communication capability, a handheld computer or personal digital assistant with communication capability, a cellular telephone, a gaming system with communication capability, a general portable communication device, a network server, a network router, a network gateway, a network controller, etc.) may communicate with other systems. For example and without limitation, a communication network may comprise a cable and/or satellite television communication network, a cellular communication network, a telecommunication network, a general data communication network (e.g., the Internet), a wireless metropolitan area network (WMAN), a wireless local area network (WLAN), a wireless personal area network (WPAN), any home or premises communication network, etc. A particular communication network may, for example, generally have a corresponding communication protocol according to which a device (e.g., a computing system and/or device) may communicate with the communication network. Unless so claimed, the scope of various aspects of the present invention should not be limited by characteristics of a particular type of communication network and/or communication protocol.

Various aspects of the present invention may, for example in a computing system (e.g., a personal computer system, an enterprise computing system, a medical facility computing system, etc.), comprise receiving a touch input from a user, and analyzing the received touch input to determine an input touch characterization of the received touch input. Various aspects may also comprise determining, based at least in part on the determined input touch characterization, touch output information comprising characteristics to cause a second system to provide a touch output representative of the received touch input, and communicating the determined touch output information to the second system. Such a second system may then, for example, comprise receiving the touch output information from the first system, and processing the received touch information to determine a manner in which to provide a touch output. Various aspects of the present invention will now be illustrated in a non-limiting manner by discussion of the following figures.

FIG. 1 shows a non-limiting exemplary flow diagram of a method 100 for communicating tactile information, in accordance with various aspects of the present invention. Any or all aspects of the exemplary method 100 may, for example, be implemented in a computer system. For example and without limitation, steps 110-150 may be performed in a first computer system at a first geographical location, and steps 160-170 may be performed in a second computer system at a second geographical location different from the first geographical location. The first and/or second computer systems may, for example, comprise personal computer systems (e.g., desktop computers, laptop computers, notebook computers, notepad computers, handheld computers, computing systems disposed in a single house or multiple housings, etc.). The first and/or second computer systems may, for example, comprise any of a variety of personal electronic devices with computing capability (e.g., personal digital assistants, smart phones, cellular telephones, personal email devices, personal media devices, gaming devices, media receivers, set top boxes, personal video recorders, etc.). The first and/or second computer systems may also, for example, comprise enterprise computer systems, health-care computer systems, distributed computer systems, cloud computer systems, etc. Accordingly, the scope of various aspects of the present invention should not be limited by characteristics of any particular type of implementing system, unless explicitly claimed.

The exemplary method 100 may begin executing at step 105. The method 100 may begin executing in response to any of a variety of causes and/or conditions, non-limiting examples of which will now be provided. For example, the exemplary method 100 may begin executing in response to user input (e.g., a user input command to begin executing). Also for example, the exemplary method 100 may begin executing in response to a timer. Additionally for example, the exemplary method 100 may begin executing in response to a detected event or system condition. For example, the method 100 may begin executing whenever a touch input is detected and/or anticipated (e.g., based on current system usage). Also for example, the method 100 may begin executing in a first system in response to a command received from a second system that is to receive touch input information from the first system. Further for example, the method 100 may begin executing in response to determining that a particular user is utilizing a first system to present an anatomical diagram or other image that generally relates to inputting user touch information. Also for example, the method 100 may begin executing in response to a reset or power-up condition (e.g., of a system dedicated to communication of tactile information). Additionally for example, the method 100 may begin executing in response to parties (e.g., respective users of a first system and a second system) agreeing to establish a tactile communication session. For example, a physician and/or patient may both expressly agree to establish a touch communication session. In general, the method 100 may begin executing in response to any of a variety of causes and/or conditions. Accordingly, the scope of various aspects of the present invention should not be limited by characteristics of any particular causes or conditions unless explicitly claimed.

The exemplary method 100 may, for example at step 110, comprise receiving a touch input (e.g., one or more touch inputs) from a user. Various non-limiting examples of such receiving will now be presented.

Any of a variety of sensor devices may be utilized at step 110 to receive such a touch (or tactile) input. For example, step 110 may comprise receiving such a touch input via a touch screen. For example, step 110 may comprise utilizing any one or more of the following: touch screens, heat sensors, capacitors, acoustical sensors, bi-metallic sensors, electrostatic sensors, electromagnetic sensors, push-button matrices, piezoelectric sensors/transducers, etc. Such sensors may, for example, be mounted to and/or formed with any of a variety of host devices (e.g., garments, suits, hats, gloves, gauntlets, mannequins, body part mock-ups, anatomical charts, sculpted figures, etc.).

Additionally, for example, step 110 may comprise utilizing position sensing to ascertain a touch input. For example, as will be discussed in more detail below, spatial location of a touch point (e.g., a user fingertip, a user hand, a probe, etc.) in relation to a model (e.g., a physical model, a 3D projected image, a 2D planar model image, etc.) may be utilized to detect and/or characterize a touch input.

Step 110 may comprise receiving any a variety of different touch inputs. For example, step 110 may comprise receiving a touch at a particular point (or location). For example, such a touch location may be characterized by any of a variety of different types of location information (e.g., map coordinates, model coordinates, sensor identification, anatomical location, position in local or global 2D and/or 3D space, etc.).

Also for example, step 110 may comprise receiving a touch input having a particular force magnitude and/or direction. For example, such a touch force may be characterized by a scalar magnitude and/or set of vector force parameters (e.g., respective force components in respective force directions, a single force magnitude at a particular direction, etc.). For example, such a touch magnitude may be sensed by a force sensor (e.g., bi-metallic sensors, piezoelectric sensors embedded in pliable material, spring-loaded force sensors, electromagnetic sensors (e.g., voice coil type sensors), heat sensors, capacitive sensors, etc.).

Additionally for example, step 110 may comprise receiving a touch input having a particular velocity (or sharpness). Such velocity may, for example, be characterized by a scalar and/or vector velocity parameter. For example, such a touch velocity may be sensed by a rate of change in position of a pliable touched surface that is moving in response to such touch. Also for example, such a touch velocity may be sensed by detecting a rate of change of a voltage output from a stressed piezoelectric transducer. Further for example, such a touch velocity may be sensed by detecting voltage output from an electromagnetic transducer due to changing electromagnetic field characteristics caused by motion of a touched surface. Additionally for example, a touch velocity may be sensed by detecting a touch moving across a surface between a plurality of sensors (e.g., disposed in an array of touch sensors). In such a scenario, a touch velocity may be sensed by determining the rate at which the detected touch moves between the plurality of sensors. The manner in which step 110 receives such touch input depends on the characteristics of the touch sensing technology being utilized (e.g., where velocity may be determined by sensor signal magnitude, rate of change of sensor signal magnitude, shape of a sensor signal curve, position information over time, etc.).

Further for example, step 110 may comprise receiving a touch input having a particular touch pattern (or progression). For example, step 110 may comprise receiving a touch input that has a movement pattern detectable by tracking touch point coordinates versus time. Such coordinates may, for example, be tracked by sampling touch position versus time, tracking touch movement between each of a plurality of sensors versus time, tracking touch screen coordinates being touched, etc. Such touch pattern receiving may also, for example, comprise identifying a particular touch pattern (e.g., by matching a detected pattern with one of a known set of predefined touch patterns, for example a circle, a straight line, etc.).

Still further for example, step 110 may comprise receiving a touch input where such input corresponds to a touched area or region. For example, step 110 may comprise receiving a touch corresponding to a fingerprint area, a palm area, a knuckle area, a hand area, a probe tip area, a band area, a body part area, etc. Such a touch area may be input in a variety of manners. For example, a matrix of sensors may be utilized, where each of the sensors corresponds to a point (or small area). In such a scenario, the aggregate of sensors receiving a touch input (e.g., at a point in time or during a time window) may be considered to be representative of a touch area. In another scenario, for example in which a capacitive matrix is utilized to couple rows and columns of a matrix, each of the row/column combinations indicative of a touch may be aggregated to represent a touched area.

In a first exemplary scenario, an image may be presented on a touch screen. Such an image may, for example, comprise a generic anatomical image, a specific anatomical image of a second (or target) user (e.g., a recorded non-real-time image or a real-time image), an image or chart of a generic body part/portion or an exact image of a body part/portion of a touch target user.

In such first exemplary scenario, step 110 may, for example, comprise receiving an input indicative of a first user touching the two-dimensional image (e.g., the two-dimensional anatomical model) presented on a display. For example, step 110 may comprise receiving a touch input from a first user touching the presented image on the touch screen at a particular location (i.e., the particular location at which the first user desires to communicate a touch to a second user or other touch target) and in a particular manner (i.e., with the type of touch that the first user desires to communicate to the second user or other touch target).

Note that a 2D screen (e.g., without 3D glasses) may be utilized to simulate 3-dimensional imaging by incorporating a 2D rotational feature (e.g., roll, pitch and/or yaw). In such an input scenario, a user may be able to indicate (e.g., by tracing a rotation on the 2D screen) a desire for the system to present a different 2D face to a 3D image. In such a scenario, for example, a user may indicate a front, back or side view (or any angle view there-between). Note that in particular views, a touch at a particular location may be indicative of a touch location and/or a touch depth (or strength), depending on the nature of the scenario (e.g., as indicated by the user).

In a second exemplary scenario, step 110 may, for example, comprise receiving an input indicative of a user touching a physical model of an object (e.g., an anatomical model or physical model of another animate or inanimate object that is to be touched remotely). For example, a mannequin may comprise embedded touch sensors that operate to detect a touch on the body of the mannequin. The touch sensors may, for example, be relatively closely spaced in areas in need of relatively finer location resolution (e.g., near joints and/or nerve centers), and may be relatively further spaced in areas generally not in need of finer location resolution. Such a sensor-containing mannequin may, for example, be part of or communicatively coupled to a computing system implementing step 110. In such an exemplary scenario, step 110 may, for example, comprise receiving a touch input from a first user touching the mannequin at a particular location and in a particular manner corresponding to a particular location and manner in which the first user desires to cause the touch to be presented to a second user (e.g., at step 170).

In a third exemplary scenario, step 110 may, for example, comprise presenting a three-dimensional image to a user. Such an image may, for example, be presented utilizing any of a variety of 3D imaging technologies. Such an image may, for example, comprise a generic anatomical image, a specific anatomical image of a second (or target) user (e.g., a recorded non-real-time image or a real-time image), an image or chart of a generic body part/portion or an exact image of a body part/portion of a touch target user, an image of another inanimate and/or animate object to be touched remotely, etc. In such first exemplary scenario, step 110 may, for example, comprise receiving an input indicative of a user touching a three-dimensional anatomical model presented by a three-dimensional display system.

For example, in such third exemplary scenario, step 110 may comprise monitoring a first user's touch location relative to the projected 3D image. For example, for a user wearing a 3D optical realization device (e.g., 3D glasses, goggles, helmet, etc.), the intended 3D object may be presented to the user at a particular location in space. In such scenario, location (e.g., in three-dimensional space) of one or more touch points of the user or touch device held by the user may be monitored and tracked. For example, in a one-finger example, the position of a user's index finger tip may be tracked (e.g., using a positioning device attached to the user's fingertip, hand and/or joints, using a position sensing glove, utilizing infrared signature tracking, etc.). As will be discussed later, such a 3D position in space may be matched to a 3D position of the presented 3D model (e.g., on the surface of a 3D image surface and/or at a depth below the surface of a 3D image surface, at a particular location within a 3D image body or volume, etc.).

Various aspects of step 110 may comprise determining when to register or capture a touch input. Step 110 may comprise triggering registration (or capture) of a touch input in any of a variety of manners, non-limiting examples of which will now be provided. For example, step 110 may comprise determining to register a touch input in response to a first user explicitly indicating a touch input. For example, a first user may press a button, input a voice command, etc., expressing a desire for registration of a touch input.

Also for example, step 110 may comprise automatically (e.g., without explicit user interaction), detecting a user input that is associated with a touch input that qualifies as a user input. Such qualification may, for example, be determined by the location of the user's touch relative to an activation envelope associated with registering a user input. For example, in an input situation where an image is presented to a user (e.g., a 2D or 3D image) a user input positioned within a spatial envelope (e.g., at or within the boundaries of a presented 2D image on a touch screen and/or at or within the boundaries of a 3D surface or body of a presented 3D image in 3D space). For example, the system implementing step 110 may detect a user touch (or hand location) within or at the boundaries of a 2D or 3D image and trigger registration of the touch.

In another exemplary scenario, step 110 may comprise periodically registering user input (e.g., at a constant period (e.g., every $\frac{1}{100}$ second, every $\frac{1}{10}$ second, every second, etc.)). In yet another exemplary scenario a user input (e.g., a user touch at a touch screen) may trigger registration of the user input.

In general, step 110 may comprise receiving a touch input (e.g., one or more touch inputs) from a user. Accordingly, the scope of various aspects of the present invention should not be limited by characteristics of a particular manner of receiving a touch input and/or by characteristics of a particular received touch input unless explicitly claimed.

The exemplary method 100 may, for example, at step 120, comprise analyzing a received touch input from a user (e.g., as received at step 110) to determine a characterization of the input touch. Various non-limiting examples of touch inputs and/or characterizations thereof were provided above (e.g., touch timing, touch location, touch shape, touch pattern, touch force magnitude, touch texture identification (e.g., scratch versus rub), etc.). Step 120 may comprise performing such analyzing in any of a variety of manners, non-limiting examples of which will now be presented.

For example, step 120 may comprise analyzing the received touch input to determine timing information characterizing timing (or temporal aspects) of the received touch input. For example, a touch input may, for example, be partially identified by temporal characteristics. For example, a touch input may be associated with a time at which such touch occurred and/or a duration over which such touch occurred. Additionally, a touch pattern may correspond to a sequence of touches and/or touch changes over a period of time.

Such temporal characteristics may, for example, be utilized to organize tactile stimulus signals output at a second system (e.g., at step 170). As an example, when tactile stimulus signals (e.g., touch characterization information) are communicated over a communication network that is unreliable and/or temporally inconsistent (e.g., a packet-switched network without higher level bandwidth guarantee mechanisms in place), temporal indications may be utilized to reconstruct the touch at the receiving system for presentation to a user of such receiving system. For example, in such an implementation, the timing at which the touch characterization information in packets arrives at a receiving system might not be critical, since the touch characterization information carried within such packets comprises temporal information that may be utilized to recreate a communicated touch at the receiving system.

Also for example, step 120 may comprise analyzing the received touch input to determine location (or spatial) information characterizing location of a received touch input. A touch may, for example, be identified by a 2D and/or 3D spatial location.

For example, in a first exemplary scenario, a first user may touch a location on a 2D image (e.g., presented to the user on a touch screen) or other 2D object (e.g., a chart, a physical model, etc.). Step 120 may then comprise identifying the location of the touch on the touch screen or other 2D object and recording such identified location. For example, the exact position of the touch relative to an image presented on a screen may be identified and recorded. Also for example, the location on the presented image nearest the determined location of the touch may be identified and recorded (e.g., as a most likely touched location). Additionally for example, the position of a touch on a physical model may be identified and recorded.

In a second exemplary scenario, a first user may utilize a touch screen (or other 2D object) to record a 3D touch input. For example, the first user may input image rotational information (e.g., yaw, pitch and/or roll) into the first system (e.g., at step 110), which may then correspondingly rotate the 2D image presented to the user (e.g., on a touch screen). As an example, a user that desires to touch a side point of a person image may provide an input notifying the first system to rotate a front view of a person to the side. The method 100 (e.g., at step 110) may then rotate the target image provided to the first user (e.g., using one or more graphical transformation matrices, using a different camera angle, using a different image projection plane, etc.), and the first user may then touch the desired side location on the new image. In such a scenario, step 120 may then comprise identifying the location of the touch on the image (or plane) presented to the first user and then identifying the 3D location of the touch on the image. For example, in providing the rotated target image to the first user, step 110 may have utilized one or more transformation matrices (e.g., including the rotation elements and/or translation elements). In such a scenario, step 120 may then utilize such transformation matrices (or corresponding inverse transformation matrices thereof) to identify the 3D location of the first user's touch. As discussed above, such location identification may, for example, be determined in terms of a local coordinate system of the target image. In such a manner, a 2D input/output user interface may be used to input 3D touch information to the first system.

In a third exemplary scenario, a 3D image may be presented to a user (e.g., at step 110). During the image presentation process, the method 100 may comprise tracking the spatial characteristics of the 3D image being presented to the user (e.g., the 3D spatial definition of the image and the 3D location of the image in space). The method 100 (e.g., at step 110) may then, for example, comprise tracking the spatial location of the first user (e.g., one or more fingers, a hand, etc.) relative to the presented 3D image to determine when virtual contact is made with such presented image. As a non-limiting example, the method 100 may comprise presenting a 3D image of a person's abdomen in 3D space. The method 100 may then (e.g., at step 110) comprise tracking the location of the first user's index finger in 3D space to determine when, and at which point, the first user's index finger contacts the presented 3D image. In such a scenario, step 120 may comprise determining and registering the location of the touch relative to the abdomen image being presented to the user.

Note that the resolution of the touch detection may be manipulated by magnifying (or de-magnifying) an image presented to the user (e.g., a 2D or 3D image). For example, if the first person desires finer touch resolution, the first person may direct the first system to zoom in on a particular portion of the image being presented to the user (e.g., presented at step 110). The method 100 may track such presentation and touching as described above in the discussion of transformation matrices, which may also include magnification/de-magnification (or zoom-in/zoom-out) parameters. In a non-limiting example, the first user may (e.g., at step 110) direct the first system to zoom in a portion of a particular joint of a body image being presented to the user. Such zoomed image will provide the first user increased touch resolution relative the joint. In another exemplary situation (e.g., a remote acupressure scenario), the first user may direct the first system to zoom in on a particular pressure point to provide the first user a relatively fine resolution with which to accurately define the location and/or other characteristics of a particular touch.

As discussed above, spatial location may, for example, be identified on a coordinate system local to the touch input system (e.g., local to a presented image, local to a mannequin, local to a 3D projected image, etc.) or may be identified on a universal coordinate system (e.g., world coordinates, etc.)

that may, for example, be common to a local touch input system and a remote touch output system.

Also for example, step 120 may comprise analyzing the received touch input to determine shape of a received touch input. A touch may, for example, be identified by a single point, but may also be characterized by a touch area.

For example, a fingertip touch may generally correspond to a fingertip area (e.g., as opposed to a single point). Similarly an input touch made with a probe may generally correspond to a probe contact area. In an exemplary scenario including a touch screen input (e.g., at step 110), step 120 may comprise utilizing the touch screen to identify a touch area rather than a single point. For example, when step 110 comprises receiving a touch on the touch screen with a fingertip of a first user, step 120 may comprise registering the surface area of the fingertip that is contacting the touch screen. Step 120 may then, for example, comprise characterizing such touch input by a location and an area. As will be discussed in more detail below, the touch area may be further qualified by touch force magnitude (e.g., a single touch force magnitude over the whole touch area, divided into sub-areas of different respective touch force magnitudes, etc.).

In another exemplary scenario, a palm press may similarly be characterized and registered by area. A first user may, for example, contact a touch screen (or a projected 3D image) with a palm. In such a scenario, step 120 may comprise characterizing the touch by location and by the surface area of the palm.

Step 120 may, for example, comprise characterizing an input touch by an aggregation of points. For example, a pinch may be represented by two touch points, a one-hand fingertip push may be represented by five touch points, a temple massage may be represented to two touch points, a squeeze may be represented by two touch areas, etc. As such, the first system may identify and characterize a plurality of touches in aggregate.

In a scenario comprising utilization of a touch sensor with the capability to identify an entire touch area, step 120 may comprise identifying and characterizing touch areas that are regularly or irregularly shaped. Also for example, step 120 may comprise comparing a detected touch area to various predefined shapes that may be associated with a touch. For example, such predefined shapes may include various predefined shapes (e.g., circles, ovals, squares, pin points, etc.) and sizes of such shapes.

Note that a detected touch may, for example, be characterized by area in a 2D sense (i.e., a planar area) and/or 3D sense (i.e., as a 3D surface). As a non-limiting example, in a scenario where a first user penetrates the surface of a 3D image with a finger touch, the portion of the first user's finger penetrating the surface may be characterized by a 3D surface in space. Alternatively, a touch may also be represented by an outline of the touch (as opposed to the surface).

Step 120 may also, for example, comprise characterizing an input touch by touch pattern. As mentioned above, a touch may be tracked (e.g., as a function of location and/or time). For example, a scratch, rub, a massage or push may be characterized by motion path (e.g., touch location in 2D and/or 3D space versus time).

In an exemplary scenario, a first user (e.g., of a first system implementing at least steps 110 and 120) may touch an image being presented on a touch screen with a moving touch, where the touch position on the touch screen changes over time. In such a scenario, step 120 may comprise tracking the touch position on the touch screen over time (e.g., determining such position periodically at a consistent time period, sampling such position at a varying temporal resolution depending on (e.g., proportional to) the rate of change of the touch position, etc.). As discussed above, 2D touching of a planar touch screen may be converted into additional dimensions. The same holds true of 2D touch pattern tracking.

In another exemplary scenario, a first user (e.g., of a first system implementing at least steps 110 and 120) may touch an image being projected in a virtual 3D viewing environment, where the touch position changes over time. In such a scenario, step 120 may comprise tracking the touch position in three dimensions over time (e.g., determining such position periodically at a consistent time period, sampling such position at a varying temporal resolution depending on (e.g., proportional to) rate of change of the touch position, etc.).

In yet another exemplary scenario, a first user (e.g., of a first system implementing at least steps 110 and 120) may touch a physical object (e.g., a sculpted object, a mannequin, model, etc.) that comprises touch sensors (e.g., embedded in the object material, attached to the objected, placed on or near the object, etc.). In such a scenario, step 120 may comprise tracking the first user's contact with such sensors over time.

Step 120 may, for example, comprise characterizing a monitored touch pattern in any of a variety of manners. For example, step 120 may comprise characterizing a monitored touch pattern as an array (or other data structure) of position (2D, 3D, etc.) versus time. Also for example, step 120 may comprise fitting a curve to a monitored touch pattern over time (e.g., utilizing linear and/or non-linear splining in any of a variety of dimensions, including 2D, 3D, etc.).

Step 120 may additionally, for example, comprise characterizing an input touch by touch force direction and/or magnitude. For example, step 120 may comprise analyzing the received touch input to determine touch force magnitude information characterizing force magnitude of the input touch. Such touch force magnitude information may, for example, be useful for a remote physician touching a point or area with varying degrees of force.

Step 120 may comprise identifying touch force direction and/or magnitude in any of a variety of manners. For example, in an exemplary scenario involving a touch screen that utilizes heat sensing to determine touch location, a temperature of a touch may be calibrated to correspond to a particular force magnitude of touch. In such an example, step 120 (or another step of the method 100) may comprise performing a calibration procedure with the user to determine a correlation between particular heat characteristics and a particular touch force magnitude. In another exemplary scenario, step 120 may comprise analyzing a touch area of a touch screen or other touch sensing device(s) to ascertain a force magnitude for a touch (e.g., a relatively forceful index finger touch on a touch screen may generally correspond to a larger area of touch than a relatively light index finger touch on a touch screen). In yet another exemplary scenario in which a capacitive (or resistive) sensor is utilized in a touch screen or other touch surface, step 120 may comprise analyzing an area of varying capacitance to ascertain magnitude for a touch. In such a scenario, step 120 (or another step of the method 100) may comprise performing a calibration procedure with the user to determine a correlation between particular capacitive (or resistive) characteristics and a particular touch magnitude.

In another exemplary scenario, step 120 may comprise receiving a second input from a user indicative of touch force direction and/or magnitude (e.g., after a first input from a user indicative of touch location). For example, the first user may touch an image at a particular location to identify a touch at a particular location, and the first user may also provide a second input (e.g., with a second finger) to input a desired touch force direction and/or magnitude to the system. Such a second input may also, for example, comprise a numeric input, touching a graphical magnitude bar or dial at a particular location, etc.

In yet another exemplary scenario in which the touch is determined relative to a 3D projected image, an amount of penetration into a boundary of an image may be indicative of a desired touch force magnitude. For example, step 120 may comprise determining that a touch barely contacting the outer dimensions of a projected image is a relatively light touch, while a touch that extends well within the boundary of a projected image is a relatively heavy (or forceful) touch. In such a scenario, step 120 (or another step of the method 100) may comprise performing a calibration procedure with the user to determine a correlation between particular touch depth characteristics and particular touch force magnitude.

In still another exemplary scenario in which touch force magnitude is measured utilizing force sensors, step 120 may comprise analyzing signals from such force sensors to determine touch magnitude (and/or direction in the case of vector force sensors).

Touch force identification may, for example, occur as a function of time. Thus, touch force characterization may, for example, be combined with the previously discussed touch pattern characterization and/or touch timing characterization. For example, various points along a touch pattern may correspond to different respective touch forces.

Touch force direction and/or magnitude identification may, for example, be performed at a plurality of touch points or at a plurality of points of a touch area. As a non-limiting example, a finger press may be characterized by a primary (most forceful) touch location surrounded by a region of relatively medium touch force, which in turn is surrounded by a region of relatively light touch force (e.g., corresponding to a finger tip portion that only lightly contacts the image). A direction for such force may, for example, be perpendicular to the touch surface. In such an example, touch force characterization may be combined with at least the touch area identification discussed above. Such touch force may, for example, be identified at a plurality of points of a touch area in any of the variety of manners discussed above (e.g., on a point-by-point basis where the entire touch is represented by a plurality of points).

Step 120 may further, for example, comprise characterizing an input touch by touch depth. For example, step 120 may comprise determining a depth of an input touch (e.g., a penetration distance beneath a target surface). Such a depth aspect of a touch may stand-alone or may be utilized as a parameter to determine other touch-related characteristics. For example, as discussed above, such touch depth may be utilized to determine touch force magnitude. Touch depth may also, for example, be identified and communicated and utilized on its own (e.g., as an indication of touch penetration distance). For example, a physician at a first system that desires to communicate a touch that penetrates a particular distance beneath the skin of a patient user of a second system may provide such a penetrating touch as an input at the first system. As with all of the other touch characteristics discussed above, step 120 may comprise tracking and/or characterizing touch depth as a function of time.

Step 120 may still further, for example, comprise characterizing an input touch by touch direction. For example, a touch may correspond to a force in a particular direction, where such direction is not necessarily perpendicular to the touched surface. A non-limiting example of such touch direction may be found in massage applications, in which touch force and/or depth may be applied in any of a variety of directions as a single touch point or area. In such a scenario, step 120 may comprise utilizing vector force sensors (e.g., located in a probe or other touch device, disposed in a touched anatomical model, etc.) that measure both force magnitude and direction. As another example, for example in a 3D application, step 120 may comprise analyzing direction of touch travel where such touch has been determined to have penetrated a surface boundary (e.g., epidermis layer) of a presented 3D image. As with all of the other touch characteristics discussed above, step 120 may comprise tracking and/or characterizing touch or touch force direction as a function of time.

In general, step 120 may comprise analyzing received touch input from a user (e.g., as received at step 110) to determine a characterization of the input touch. Accordingly, the scope of various aspects of the present invention should not be limited by characteristics of any particular manner of performing such analysis nor by any particular manner of characterizing a touch input unless explicitly claimed.

The exemplary method 100 may, for example at step 130, comprise providing feedback to a user providing a touch input (e.g., regarding the touch input received at step 110 and analyzed at step 120). Various non-limiting examples of such feedback will now be provided.

Step 130 may, for example, comprise providing feedback information to a first user regarding the first user's input touch. In such a manner, the first user may be informed of the system's characterization of the input touch. The first user may thus gain an understanding of the touch characteristics to be communicated to another system (e.g., to know whether touch characteristics to be communicated to a second system are as intended). For example, as the first user applies a touch force at the first system, such touch force may be fed back to tactile output devices coupled to the first user, so the first user may experience characteristics of the touch being input. As a non-limiting example, the first user may wear a glove with finger positioning sensors that determine when the first user is contacting a three-dimensional image being presented to the user. In such an example, the glove may comprise a physical transducer (e.g., pneumatic pressure transducer, electromagnetic or solenoid transducer, contracting membrane transducer, etc.) that step 130 may utilize to apply a pressure to the first user indicative of the touch input from the first user input at step 110 and characterized at step 120. Also in such an example, the first user may be coupled to robotic actuators that apply a force to the first user (e.g., to the first user's hand) that is generally the opposite of a calculated touch input force from the user. In such a configuration, a user touching a virtual image may be provided with physical touch feedback when no physical contact is made during the input process (e.g., as opposed to a scenario in which a physical model is utilized for touch inputs).

In another exemplary scenario, step 130 may comprise providing a visual indication of a registered touch input to a user. For example, in a scenario in which a user inputs a touch input utilizing a touch screen, step 130 may comprise generating a visual (e.g., a graphical) indication on the touch screen indicative of the touch input being registered, indicative of various characteristics of the input touch (e.g., location, time, magnitude, direction, area, etc.).

Additionally, as mentioned above, the communication link between the first system and the second system (or other systems) may be a two-way communication link (e.g., with regard to touch information as well as other types of information). In such a scenario, step 130 may comprise receiving return tactile information that is returned from the second system and presenting such tactile information to the first user (e.g., in a manner generally analogous to the manner discussed below with regard to step 170). In such an exemplary scenario, the first user may similarly receive sensory signals (e.g., corresponding to a touch input by the second user to the second system).

The second system (e.g., a second system receiving tactile input information from the first system regarding touch outputs to provide to a user of the second system) may also provide non-tactile forms of feedback information to the first system. For example, in a medical scenario in which a user physician utilizes the first system to communicate touch information to a user patient of a second system, the second system may determine (e.g., utilizing sensors coupled to the second user) heart rate, blood pressure, body temperature, reflex reactions (e.g., responses to a particular touch), nervous activity, eye reactions, audio/visual feedback, brain activity, etc.). The second system may then communicate such accumulated information back to the first system (e.g., for presentation to the user physician).

In general, step 130 may comprise providing feedback to a user providing a touch input (e.g., providing the touch input received at step 110 and analyzed at step 120). Accordingly, the scope of various aspects of the present invention should not be limited by particular characteristics of any particular manner of providing such feedback nor of any particular type of touch feedback or any other type of feedback information unless explicitly claimed.

The exemplary method 100 may, for example at step 140, comprise determining information to communicate to one or more other systems (e.g., a second system). Such information may, for example, comprise information of the touch characterization determined at step 130. Such information may also comprise non-tactile information (e.g., audio, textual and/or video information, etc.). Various non-limiting examples of such information determination will now be provided.

Step 140 may, for example, comprise determining, based at least in part on the input touch characterization determined at step 120, touch output information comprising characteristics to cause the second system to provide a touch output representative of the touch input received at step 110. For example, after the characteristics of a touch input are determined (as discussed above), the first system (e.g., implementing step 140) may operate to determine the touch information that is to be communicated to the second system.

In a first exemplary scenario, step 140 may comprise communicating all determined touch characterization information to a second system (or a plurality of other systems), where the second system may then, for example, determine whether and/or how a touch characterized by such communicated touch characterization information will be presented to a user of the second system. For example, step 130 may comprise characterizing a touch input as accurately as possible, and step 140 may comprise communicating information of such characterization to the second system (or any number of systems). The second (or receiving) system may then, for example, process such touch information for presentation to a user of such second system in accordance with the capabilities of such second system. In such an exemplary scenario, a first system (e.g., implementing steps 110-150) need not concern itself with the capabilities of the receiving system(s). For example, a second system receiving touch characterization information describing touch characteristics that the second system is incapable of outputting to a user may simply ignore such touch characteristics (or, for example, return a message to the first system indicating that the second system is incapable of outputting such touch characteristics).

In another exemplary scenario, step 140 may comprise (e.g., at the first system operated by the first user) determining touch output information based, at least in part, on tactile output capabilities of the second system. Such implementation may, for example, be advantageous in a scenario where the majority of system complexity (and cost) is incorporated into the first system. Such implementation may, for example, allow for a relatively cost-effective second system. For example, in a medical scenario, the first system may comprise a relatively complex and high-cost hospital system and the second system may comprise a relatively simple and low-coast end user system that may be replicated between a large number of end users associated with the hospital.

In such an exemplary scenario, step 140 (or another step of the method 100) may, for example, comprise communicating with the second system (or access a database, etc.) to determine the touch transducer configuration and/or associated processing and/or touch outputting capability of the second system. In such a scenario, step 140 may then, for example, comprise tailoring the touch characterization information communicated to the second system in accordance with any or all of such capabilities of the second system. Such an implementation may, for example, also reduce the communication of unnecessary touch characterization information.

Also, in such an implementation, the method 100 may comprise (e.g., at steps 110 and 120) determining which input touch characteristics to monitor based on the second system's capabilities. For example, monitoring a touch pattern, analyzing a received touch pattern and communicating information characterizing the touch pattern in a first (or transmitting) system may be skipped in an exemplary configuration in which a second (or receiving) system is incapable of outputting a touch having a particular touch pattern to a user of the second system. Also for example, monitoring a touch area, analyzing an input touch over an area and communicating information characterizing the touch area in a first (or transmitting) system may be skipped in an exemplary configuration in which a second (or receiving) system is only capable of outputting a touch having a particular touch area to a user of the second system. In such an implementation, the method 100 may efficiently collect, analyze and communicate only touch characteristics that are currently relevant given the current system configuration.

Step 140 may also comprise determining non-tactile information to communicate with one or more other systems along with the determined touch information. For example, step 140 may comprise determining audio and/or video information to be communicated to a second system along with the touch characterization information. Further for example, such additional information may comprise temperature information (e.g., communicated to and/or from the user of the second system). For example, in a medical scenario, a user physician of a first system may communicate audio information with a remote user patient of a second system, such audio information for example corresponding to the touch information being communicated to the second system or user thereof. In such a scenario, a physician may communicate audio information to a remote user patient explaining touch occurrences and soliciting feedback (e.g., audio feedback) from the remote user patient.

In general, step 140 may comprise determining information (e.g., touch characterization information and other accompanying information) to communicate from the first system to the second system. Accordingly, the scope of various aspects of the invention should not be limited by characteristics of any particular type of touch information or accompanying information nor by any particular manner of determining such information unless explicitly claimed.

The exemplary method 100 may, for example at step 150, comprise communicating the information (e.g., the touch characterization information and/or any other related information) to one or more recipient systems for such information. Step 150 may comprise performing such communicating in any of a variety of manners, non-limiting examples of which will now be provided.

For example, step 150 may comprise communicating utilizing a particular communication protocol. As a non-limiting example, such a communication protocol may reside primarily at an application layer of a layered communication protocol architecture. Such an application layer may, for example, reside above various lower level protocol layers (e.g., network layer, transport layer, data link layer, physical layer, etc.). In such an implementation, step 150 may comprise communicating the information utilizing any of a variety of different communication networks or types thereof. In other words, the relatively lower layers of the communication network stack (e.g., below the application layer) might be flexible and varied.

For example, in an exemplary scenario, step 150 may comprise communicating the information via a communication network that allocates a specific amount of bandwidth for a communication (e.g., a particular channel, frequency, timeslot, code, etc.). Also for example, in another exemplary scenario, step 150 may comprise communicating the information via a variable-bandwidth communication network that does not guarantee (or allocate) communication bandwidth for a communication link (e.g., general packet-based data communication networks with no control of overall network utilization, the Internet, etc.).

In an exemplary scenario, first and second systems may comprise communication modules operable to communicate via the Internet, cable television network, local area network, satellite communication network, cellular communication network, wire line telecommunication network, personal area network, campus network, etc. Such communication may be performed utilizing any of a variety of communication protocols and media.

Various aspects of the present invention may comprise a communication protocol (e.g., utilized at step 150) comprising various aspects tailored to the communication of touch information between systems. Such protocol may, for example, comprise particular packet formats (e.g., data fields) dedicated to any one or more of the touch characteristics discussed above, any of the touch timing characteristics, etc.). Such a protocol may, for example, comprise characteristics for communicating touch information in a single direction and/or in a plurality of directions (e.g., 2-way, N-way, etc.). For example, though the exemplary illustrations presented previously generally concerned the communication of touch characterization information from a first system to a second system (e.g., to a remote second system via a communication network), such a communication protocol may comprise characteristics adapted to communicate such touch characterization information in both directions (e.g., from the first system to the second system and/or other systems, and from the second system and/or other systems to the first system).

In general, step 150 may comprise communicating the information (e.g., the touch characterization information and/or any other related information) to one or more recipient systems for such information. Accordingly, the scope of various aspects of the present invention should not be limited by characteristics of any particular manner of performing such communicating unless explicitly claimed.

The exemplary method 100 may, for example at step 160, comprise receiving touch (or tactile) information (e.g., the touch characterization information and/or related information communicated at step 150). Step 160 may, for example, represent receiving performed by the recipient system of the information communicated at step 150 by a first system and/or may also comprise receiving tactile information (and/or other information) communicated from another system back to the first system. Step 160 may comprise performing such receiving in any of a variety of manners. For example, step 160 may comprise receiving the information in a manner corresponding to which such information is transmitted (e.g., at step 150) by another system. Many examples of the communication of touch information and/or related information were discussed above.

The exemplary method 100 may, for example at step 165, comprise processing the touch information received at step 160 (e.g., to determine a touch output at a system which received the touch information). Step 165 may comprise performing such processing in any of a variety of manners, non-limiting examples of which will now be presented.

For example, step 165 may comprise determining one or more output signals to cause one or more tactile output devices to output a touch output representative of the touch input received by the first system. As discussed above, a first system (e.g., performing steps 110-150) may communicate touch characterization information to a second system (and/or or one or more other systems).

The second (or recipient) system may then receive such touch characterization information (e.g., at step 160) and process such received touch characterization information to determine driver signals for tactile output devices (transducers, etc.) of the second system, where such driver signals are determined to communicate a touch output to a user of the second system. Step 165 may, for example, comprise translating information characterizing a particular input touch at the first system to output signals adapted to cause presentation of an output touch to a user of the second system.

The second system may, for example, comprise tactile output devices (e.g., transducers) that operate to output a touch sense to a user of the second system. Non-limiting examples of such tactile output devices may, for example, include electromechanical devices (e.g., rotational and/or translational robotic actuators, solenoids, rotational and/or linear motors, etc.) that may be coupled to a user, electrostatic output devices (e.g., electrostatic stimulation devices or pads placed proximate to and/or in contact with the body of the second user), pump/vacuum devices (e.g., pneumatic pressure bands, etc.), contracting fibers or filaments in a garment (e.g., electrostatic, based on nano-structures, etc.).

Additionally, the second system may output non-tactile forms of information to a user to be related by the user to tactile information. For example, the second system may output a graphical image comprising graphical indications of a touch input from a first user of the first system. The second user may then view the visual indications and interpret such visual indications as tactile indications. For example, the second system may output an anatomical image (or map) on a screen to a second user, where the map indicates visually that the first user has touched a particular area.

Each of the tactile output devices of the second system may be configured to output a range of tactile (or touch) outputs to the second user. Each of such tactile output devices may correspond to an operational profile that correlates a desired tactile output to one or more particular inputs (or sequences thereof). Accordingly, step 165 (e.g., as implemented in the second (or recipient) system, upon receiving at step 160 information characterizing a touch to provide the second user, may comprise determining tactile output device driver signals corresponding to the desired touch output corresponding to the received touch characterization information. Such driver signal-to-output relationship(s) may, for example, be defined in a look-up table and/or an equation that accepts a desired touch output as an input and provides the corresponding tactile transducer driver signal(s). As a non-limiting example involving an electromagnetic touch output transducer, such a table may specify respective amounts of electrical current to cause such output transducer to output respective touch forces at respective force magnitudes.

In an exemplary scenario in which the second system comprises a plurality of tactile output transducers with which to generate touch outputs, step 165 may comprise identifying one or more particular tactile output transducers to utilize. For example, the step 165 may comprise identifying one or more particular tactile output devices that correspond to a desired touch output (e.g., tactile output devices that are positioned to output a desired tactile output at a particular location and/or set of locations corresponding to an area and/or along a particular touch pattern).

There may, for example, be a one-to-one relationship between touch input sensors at a first system at which a touch input is provided and touch output transducers at a second system at which a touch output is provided. There may similarly be an N-to-one relationship. In an exemplary one-to-one scenario, a single device may serve as both a touch input sensor and a touch output transducer. For example and without limitation, piezoelectric elements, voice coil structures or solenoids, inflatable pneumatic air bags, and the like may be utilized as both touch input and touch output devices, depending on whether such devices are being electrically (or pressure) sensed or electrically (or pressure) driven.

As discussed previously, a touch input may comprise temporal characteristics (e.g., related to a single touch, a sequence of touches, a touch movement, etc.), and information of such temporal characteristics may be communicated to a recipient system. In such a scenario, step 165 may comprise determining the timing of one or more touch output signals based, at least in part, on touch timing information received at step 160. As explained previously, since the communication of touch information from a first system to a second system (e.g., at step 150) may be performed over an unpredictable network, the communication of touch timing information provides for irregularly received information (even information received out of order) characterizing a touch to be reconstructed in a temporal manner that is true to the original touch input at step 110.

In an exemplary scenario in which the communicated touch characteristics comprise a touch pattern, step 165 may comprise continually determining and outputting tactile output signals (e.g., driver signals to touch output transducers) along the desired touch pattern. Such determination and outputting may, for example, be synchronized in time with the touch input by a first user at a first system (e.g., at step 110).

In general, step 165 may comprise processing the touch information received at step 160 (e.g., to determine a touch output at a system which received the touch information). Accordingly, the scope of various aspects of the present invention should not be limited by characteristics of any particular manner of performing such processing unless explicitly claimed.

The exemplary method 100 may, for example at step 170, comprise outputting tactile information (e.g., a touch) to a user in a human-perceivable form. Step 170 may comprise performing such outputting in any of a variety of manners, non-limiting examples of which will now be presented.

For example, after determining signals to output to one or more tactile output devices (e.g., at step 165), step 170 may comprise outputting such signals (e.g., to one or more touch output transducers). In response to receiving such output signals, the various one or more tactile output devices (or transducers) will then operate to provide the communicated touch (e.g., to a user of the recipient system or to another target). Such tactile output devices may, for example and without limitation, comprise any one or more of the following: bi-metallic motion transducers, electrostatic motion transducers, electromagnetic motion transducers (e.g., solenoid transducers, voice coil transducers, etc.), piezoelectric transducers, etc. Such transducers may, for example, be mounted to and/or formed with any of a variety of host devices (e.g., garments, suits, hats, gloves, gauntlets, etc.) which may, for example, be worn by or coupled to a second user to which a touch is desired to be communicated.

Note that the outputting performed at step 170 may comprise outputting information (e.g., data) corresponding to a desired touch output or may, for example, comprise outputting touch transducer driver signals to such transducers.

The exemplary method 100 may, for example at step 195, comprise performing continued operation. Such continued operation may comprise any of a variety of characteristics. For example and without limitation, step 195 may comprise returning execution flow of the exemplary method 100 to any previous method step. Also for example, step 195 may comprise further interacting with the first system and/or user thereof, second system and/or user thereof, or any user and respective system (e.g., in a multicast or broadcast scenario) for continued communication of touch between users at respective systems.

As mentioned previously, various steps of the exemplary method 100 may be performed in a first system and/or a second system. For example and without limitation, steps 110-150 may be performed in a first computer system at a first geographical location, and steps 160-170 may be performed in a second computer system at a second geographical location different from the first geographical location. The first and/or second computer systems may, for example, comprise personal computer systems (e.g., desktop computers, laptop computers, notebook computers, notepad computers, handheld computers, computing systems disposed in a single house or multiple housings, etc.). The first and/or second computer systems may, for example, comprise any of a variety of personal electronic devices with computing capability (e.g., personal digital assistants, smart phones, cellular telephones, personal email devices, personal media devices, gaming devices, media receivers, set top boxes, personal video recorders, etc.). The first and/or second computer systems may also, for example, comprise enterprise computer systems, health-care computer systems, distributed computer systems, cloud computer systems, etc. A non-limiting exemplary block diagram of such systems and/or devices will now be presented.

Figure 2:
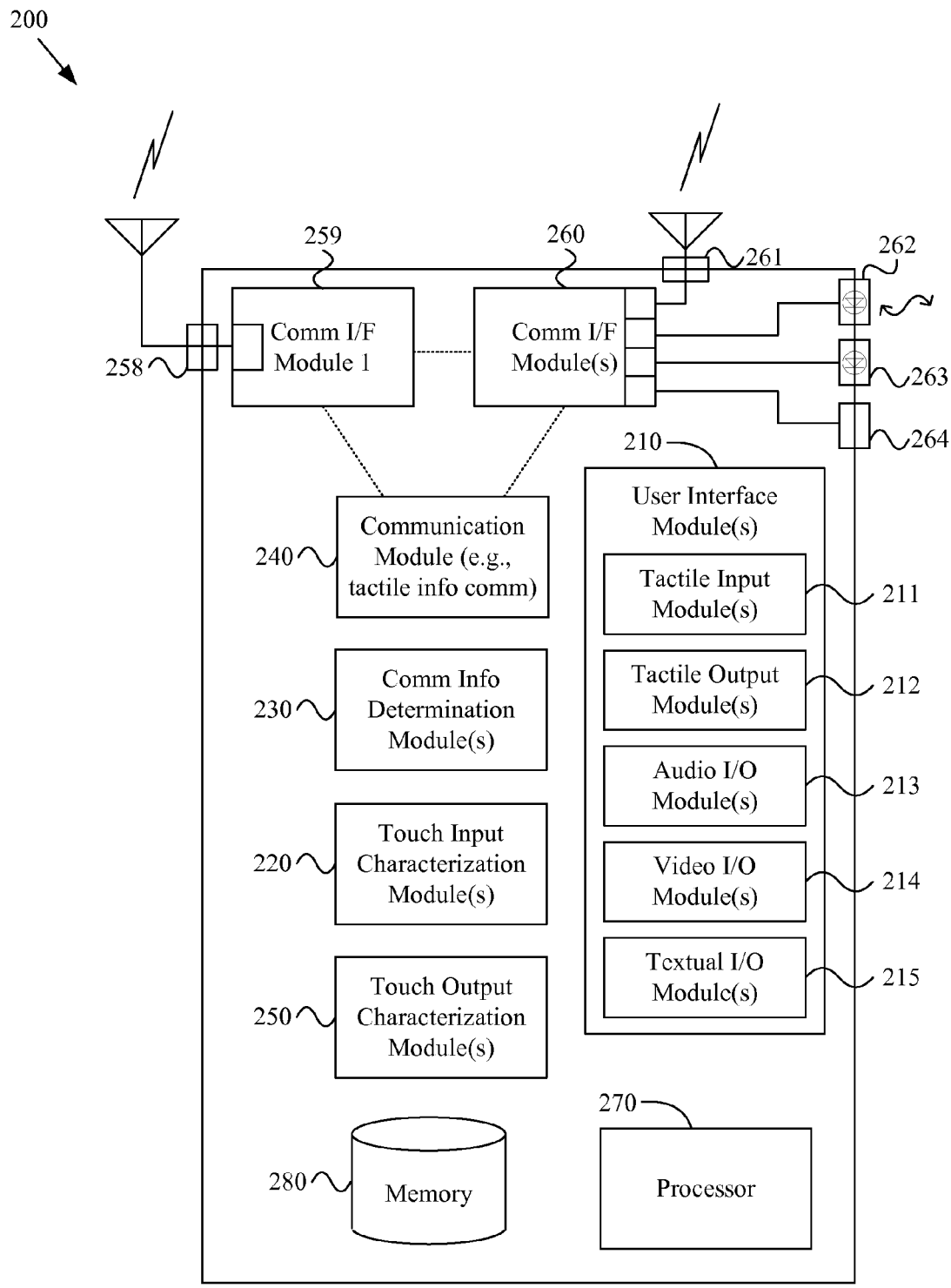
FIG. 2 shows a non-limiting exemplary block diagram of a system for communicating tactile information in accordance with various aspects of the present invention.

FIG. 2 shows a non-limiting exemplary block diagram of a system 200 for communicating tactile information (or touch) in accordance with various aspects of the present invention. Such system 200 may, for example, represent a first system (or touch input system) discussed above and/or a second system (or touch output system) discussed above. The system 200 may, for example, be implemented in any one or more of the above-mentioned systems and/or devices. The exemplary system 200 (or modules thereof) may operate to perform any or all of the functionality discussed previously with regard to the method 100 illustrated in FIG. 1.

The system 200 may, for example, comprise one or more communication interface modules 259 and 260 that operate to perform any or all of the communication interface functionality discussed herein. The communication interface module(s) 259 and 260 may, for example, operate to communicate over any of a variety of communication media and utilizing any of a variety of communication protocols (e.g., including operating in accordance with various respective protocol layers, for example, PHY, MAC, network, transport, etc.). For example, the communication interface module(s) 259 and 260 may be operable to communicate via one or more wired and/or wireless communication ports (e.g., via wireless RF ports 258 and 261, non-tethered optical port 262, tethered optical port 263, wired port 264, etc.). The communication interface module(s) 259 and 260 may, for example, operate to communicate with one or more communication networks (e.g., cable television networks, satellite television networks, telecommunication networks, the Internet, local area networks, personal area networks, metropolitan area networks, etc.) via which information (e.g., touch information and/or information related to touch information, etc.) is communicated. Also for example, the communication interface module(s) 259 and 260 may operate to communicate with local sources of tactile information (e.g., various touch input sensors, various touch output transducers, etc.) that may, for example, be external to but communicatively coupled to the system 200.

The exemplary system 200 may also comprise additional communication interface modules, which are not illustrated. Such additional communication interface modules may, for example, share any or all aspects with the communication interface module(s) 259 and 260 discussed above.

The exemplary system 200 may, for example, comprise one or more user interface modules 210. As discussed previously, such user interface module 210 may comprise any of a variety of user interface modules.

For example, the user interface module(s) 210 may comprise a tactile input module 211 that operates to manage user input of tactile (i.e., touch) information into the system 200. Many examples of such tactile input and/or corresponding input devices were presented above. For example, the tactile input module 211 may operate to implement any or all of the tactile input functionality discussed previously (e.g., with regard to step 110 of the exemplary method 100 illustrated in FIG. 1). For example, the tactile input module 211 may operate to utilize a video output module to provide an image to the user on a touch screen, who may then provide touch input by touching the touch screen relative to the provided image.

The user interface module(s) 210 may, for example, comprise a tactile output module 211 that operates to manage user output of touch (or touch information) to a user of the system 200. Many examples of such tactile output and/or corresponding output devices were presented above. For example, the tactile output module 212 may operate to implement any or all of the tactile output functionality discussed previously (e.g., with regard to step 170 and step 130 of the exemplary method 100 illustrated in FIG. 1).

The user interface module(s) 210 may, for example, comprise user I/O modules corresponding to any of a variety of non-tactile user interface information (e.g., one or more audio I/O modules 213, video I/O modules 214, textual I/O modules 215, etc.). Many examples of such non-tactile I/O were presented above. For example, such other I/O may operate to implement any or all of the non-tactile I/O functionality discussed previously (e.g., with regard to step 170 and step 130 of the exemplary method 100 illustrated in FIG. 1).

The system 200 may, for example, comprise a tactile input characterization module 220 that operates to perform any or all of the tactile input identification/characterization functionality discussed above (e.g., temporal characterization, spatial location characterization, touch shape characterization, touch pattern identification/characterization, touch force direction and/or magnitude characterization, touch direction characterization, etc. For example, the tactile input characterization module 220 may operate to implement any or all of the tactile input analysis and/or characterization functionality discussed previously (e.g., with regard to step 120 of the exemplary method 100 illustrated in FIG. 1).

The system 200 may also, for example, comprise a communication information determination module 230. Such module may, for example, operate to perform any or all of the functionality discussed above related to determining information to communicate to a second system (e.g., tactile characterization information, non-tactile information related to the tactile communication, etc.). Such module 230 may, for example, operate to implement any or all functionality discussed previously with regard to step 140 of the exemplary method 100 illustrated in FIG. 1.

The system 200 may further, for example, comprise a tactile information communication module 240. Such module 240 may, for example, operate to perform any or all of the functionality discussed previously with regard to the communication of tactile characterization information (e.g., with one or more other systems, for example, remote systems). Such module 240 may, for example, operate to perform any or all of the functionality discussed previously with regard to step 150 of the exemplary method 100 illustrated in FIG. 1. As an example, the tactile information communication module 240 may utilize one or more communication interface modules 259-260 of the system 200, where such modules in turn operate to communicate over any of a variety of communication networks utilizing any of a variety of communication protocols and/or media (e.g., via wireless RF ports 258 and 261, non-tethered optical port 262, tethered optical port 263, wired port 264, etc.) with any of a variety of other systems. Many non-limiting examples of such networks, protocols and/or other systems were provided previously.

The system 200 may additionally, for example, comprise a touch output characterization module 250. Such a module 250 may, for example, operate to perform any or all of the tactile output functionality discussed previously (e.g., with regard to step 170 of the exemplary method 100 illustrated in FIG. 1) and/or any or all of the tactile information processing functionality discussed previously (e.g., with regard to step 165 of the exemplary method 100 illustrated in FIG. 1). Such module 250 may, for example, operate to utilize the one or more tactile output modules 212 to output tactile information (e.g., to output tactile data to touch output devices, to output tactile transducer driver signals, etc.) in human-perceivable form utilizing any of a variety of tactile output devices, many examples of which were provided previously.

The system 200 may also, for example, comprise one or more processors 270 that operate to perform any of a variety of functionality of the system 200 (e.g., by executing instructions stored in a memory 280 of the system 200). The processor module(s) 270 may comprise characteristics of any of a variety of processors (e.g., general purpose microprocessors, microcontrollers, digital signal processors, application-specific integrated circuits, etc.).

The system 200 may additionally, for example, comprise one or more memories (or memory module(s)) 280. As discussed above, any or all functional aspects discussed herein may be performed by one or more processors (e.g., the processor(s) 270) executing instructions. Such instructions may, for example, be stored in the one or more memories 280. Such memory 280 may, for example, comprise characteristics of any of a variety of types of memory. For example and without limitation, such memory 280 may comprise one or more memory chips (e.g., ROM, RAM, EPROM, EEPROM, flash memory, one-time-programmable OTP memory, etc.), hard drive memory, CD memory, DVD memory, etc.

The system 200 is illustrated with separate functional modules for illustrative clarity. Such modules, in practice, need not be distinct. For example, any or all functionality of the various modules may be implemented by a processor executing software instructions and/or by various hardware and/or software components. Such modules may also, for example, share various hardware and/or software components.

Figure 3:
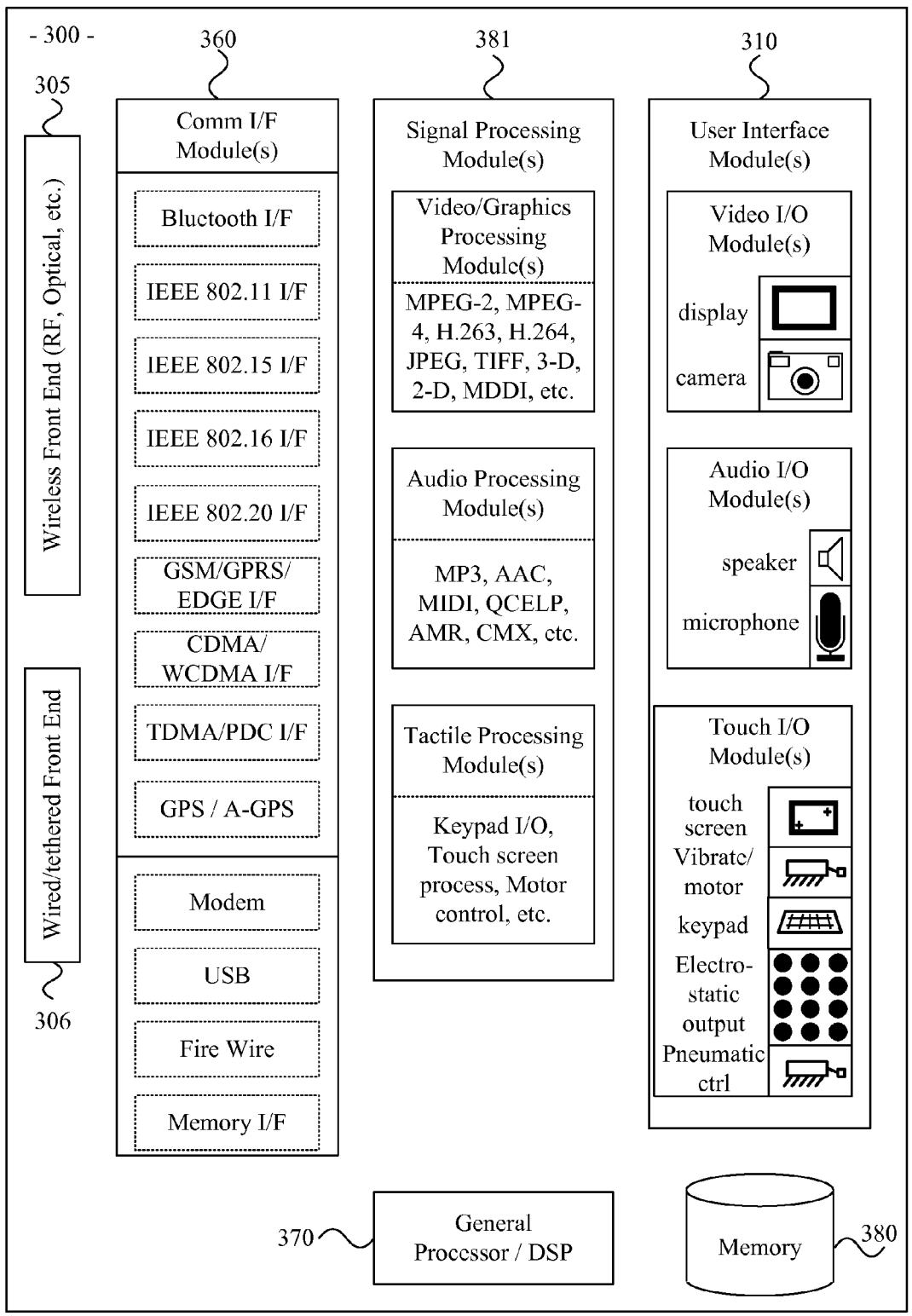
FIG. 3 shows a non-limiting exemplary block diagram of a system for communicating tactile information in accordance with various aspects of the present invention.

Turning next to FIG. 3, such figure shows a non-limiting exemplary block diagram of a system 300 in accordance with various aspects of the present invention. The exemplary system 300 may, for example and without limitation, share any or all characteristics with the system 200 illustrated in FIG. 2 and discussed previously. For example, the exemplary system 300 (or any or all of the components thereof) may operate to perform any or all of the steps illustrated in FIG. 1 and discussed previously. As with the system 200 illustrated in FIG. 2, the components of the exemplary system 300 may be disposed in a single computer system or device, many non-limiting examples of which were provided above.

For example, the system 300 comprises one or more processors 370. Such processor(s) 370 may, for example, share any or all characteristics with the processor(s) 270 discussed with regard to FIG. 2. Also for example, the system 300 comprises one or more memories 380. Such memory 380 may, for example, share any or all characteristics with the memory 280 discussed with regard to FIG. 2.

Also for example, the system 200 may comprise any of a variety of user interface module(s) 310. Such user interface module(s) 310 may, for example, share any or all characteristics with the user interface module(s) 210 discussed previously with regard to FIG. 2. For example and without limitation, the user interface module(s) 310 may comprise: a display device, a camera (for still or moving picture acquisition), a speaker, an earphone (e.g., wired or wireless), a microphone, a video screen (e.g., a touch screen), a vibrating mechanism, a keypad, one or more arrays of input touch sensors and/or touch output transducers, a pneumatic controller and/or pressure sensors, and/or any of a variety of other user interface devices (e.g., a mouse, a trackball, a touch pad, touch screen, light pen, game controlling device, etc.).

The exemplary system 200 may also, for example, comprise any of a variety of communication modules (305, 306, and 360). Such communication module(s) may, for example, share any or all characteristics with the communication interface module(s) (259 and 260) discussed previously with regard to FIG. 2. For example and without limitation, the communication interface module(s) 360 may comprise: a Bluetooth interface module; an IEEE 802.11, 802.15, 802.16 and/or 802.20 module; any of a variety of cellular telecommunication interface modules (e.g., GSM/GPRS/EDGE, CDMA/CDMA2000/1×-EV-DO, WCDMA/HSDPA/HSUPA, TDMA/PDC, WiMAX, etc.); any of a variety of position-related communication interface modules (e.g., GPS, A-GPS, etc.); any of a variety of wired/tethered communication interface modules (e.g., USB, Fire Wire, RS-232, HDMI, Ethernet, wire line and/or cable modem, etc.); any of a variety of communication interface modules related to communicating with external memory devices; etc. The exemplary system 200 is also illustrated as comprising various wired 306 and/or wireless 305 front-end modules that may, for example, be included in the communication interface modules and/or utilized thereby.

The exemplary system 200 may also comprise any of a variety of signal processing module(s) 381. Such signal processing module(s) 381 may share any or all characteristics with modules of the exemplary system 200 that perform signal processing. Such signal processing module(s) 381 may, for example, be utilized to assist in processing various types of information discussed previously (e.g., with regard to touch sensor input processing, touch transducer output processing, position determination, video processing, image processing, audio processing, general user interface information data processing, etc.). For example and without limitation, the signal processing module(s) 381 may comprise: video/graphics processing modules (e.g. MPEG-2, MPEG-4, H.263, H.264, JPEG, TIFF, 3-D, 2-D, MDDI, etc.); audio processing modules (e.g., MP3, AAC, MIDI, QCELP, AMR, CMX, etc.); and/or tactile processing modules (e.g., keypad I/O, touch screen processing, motor control, etc.).

In summary, various aspects of the present invention provide a system and method for communicating tactile information (or touch). While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for communicating tactile information from a first geographic location to a second geographic location, the method comprising:
   in a first system located at the first geographic location:
   receiving a touch input from a first user, the touch input including at least a force and a representation of a touch area of the first user;
   providing feedback to the first user based on the touch input to register the touch input;
   communicating with a second system located at the second geographic location to determine touch outputting capabilities of the second system, including determining, at least in part, a transducer configuration of the second system;
   determining touch input information to be communicated to the second system based on the determined touch outputting capabilities of the second system and the registered touch input; and
   communicating the touch input information to the second system.

2. The method of claim 1, wherein determining the touch outputting capabilities of the second system further comprises determining, at least in part, processing capabilities of the second system.

3. The method of claim 1, wherein determining the touch outputting capabilities of the second system further comprises determining, at least in part, tactile devices associated with the second system.

4. The method of claim 1 further comprising communicating non-touch information with the touch input information and the determining touch outputting capabilities of the second system further includes determining non-touch capabilities associated with the second system.

5. The method of claim 4, wherein the non-touch capabilities associated with the second system include any of: audio, textual, video, or temperature information.

6. The method of claim 1, comprising in the second system, converting the communicated touch input information to touch output at the second system using one or more tactile output devices.

7. The method of claim 1, wherein the determining touch input information to be communicated to the second system comprises analyzing the registered touch input to determine one or more of: timing information characterizing timing of the registered received touch input; position information characterizing a spatial location of the registered received touch input; magnitude information characterizing a magnitude of the force of the registered received touch input; direction information characterizing a direction of the registered received touch input; a touch pattern of the registered received touch input; a touch region of the registered received touch input; a touch shape of the registered received touch input; a touch texture of the registered received touch input; or rate of change in position of the registered received touch input.

8. A method for communicating tactile information from a first system at a first geographic location to a second system at a second geographic location, the method comprising:
 in the second system located at the second geographic location:
  receiving a communication of at least touch input information from the first system at the first geographic location, the touch input including at least a force and a representation of a touch area of a first user;
  determining touch outputting capabilities of the second system, including determining, at least in part, any of: transducer configuration of the second system, processing capabilities of the second system or tactile devices associated with the second system;
  determining touch output information to be processed by the second system based on the determined touch outputting capabilities of the second system and the touch input information; and
  communicating the touch output information to a second user located at the second geographic location.

9. The method of claim 8, wherein, when determining that the touch outputting capabilities of the second system are less than those of the first system, ignoring aspects of the touch input information from the first system that the second system is incapable of reproducing.

10. The method of claim 9, wherein, when the touch outputting capabilities are less than those of the first system, returning to the first system a message indicating the touch outputting capabilities that the second system is incapable of outputting.

11. The method of claim 8, wherein the first touch input is a touch to a model, the model comprising one or more of: a three-dimensional anatomical model presented by a three-dimensional display system; a two-dimensional anatomical model presented on a display; a physical anatomical model; or garments.

12. A system for communicating tactile information, the system comprising:
 a first system, including a processor, located at a first geographic location, the processor configured to:
  receive a touch input from a first user, the touch input including at least a force and a representation of a touch area of the first user;
  provide feedback to the first user based on the touch input to register the touch input;
  communicate with a second system located at a second geographic location to determine touch outputting capabilities of the second system, including determining, at least in part, any of: transducer configuration of the second system, processing capabilities of the second system or tactile devices associated with the second system;
  determine touch input information to be communicated to the second system based on the determined touch outputting capabilities of the second system and the registered touch input; and
  communicate the touch input information to the second system.

13. The system of claim 12, further comprising the touch input comprising a touch of a model comprising one or more of: a two-dimensional anatomical model presented on a display; a three-dimensional display system; or a physical anatomical model.

14. The system of claim 12, wherein the processor is further configured to analyze the registered touch input to determine an input touch characterization by, at least in part, one or more of: operating to analyze the registered received touch input to determine timing information characterizing timing of the registered received touch input; operating to analyze the registered received touch input to determine location information characterizing location of the registered received touch input; or operating to analyze the registered received touch input to determine magnitude information characterizing the force of the registered received touch input.

15. The system of claim 12, wherein the processor is further configured to process the touch input information received from the first system to determine a manner in which to provide a touch output by, at least in part, one or more of: operating to identify one or more tactile output devices to utilize to provide the touch output; operating to determine one or more output signals to cause one or more tactile output devices to output a touch output representative of a touch characterized by the touch input information received from the first system; or operating to determine timing of the one or more output signals based, at least in part, on touch timing information included with the touch input information received from the first system.

16. The system of claim 12, comprising in the second system, providing the touch output at the second system to one or more tactile output devices.

17. The system of claim 12, wherein the touch input information includes an aggregation of touch sensor inputs for any of the touch area; touch pattern; touch region; touch shape; or touch texture.

* * * * *